N. F. FONER.
FASTENER AND SNAP.
APPLICATION FILED JUNE 6, 1916.
1,202,372.
Patented Oct. 24, 1916.
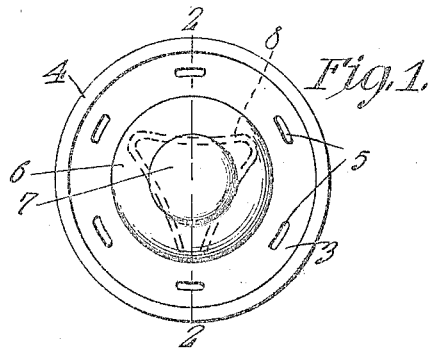
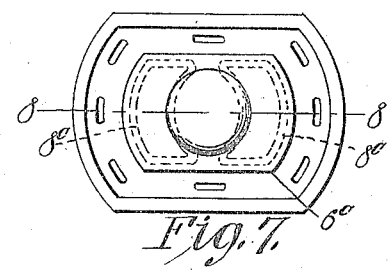
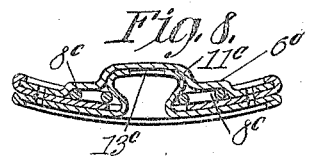
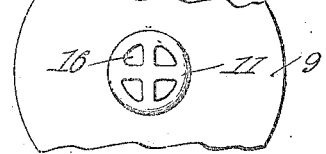
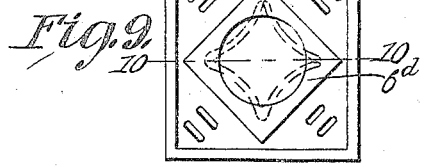
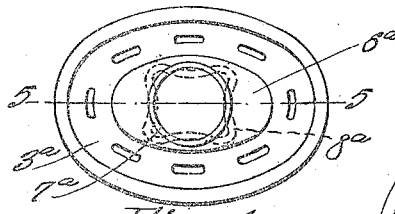
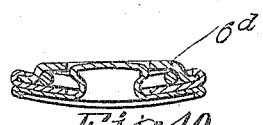
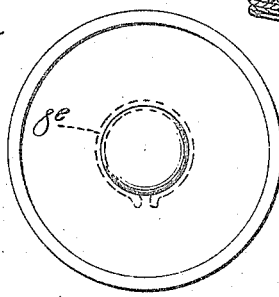
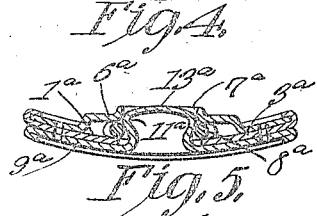
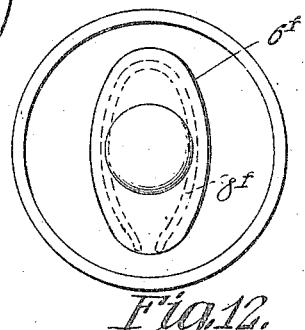
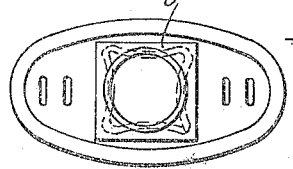
Witnesses
N. F. Foner, Inventor
by
Attorneys

UNITED STATES PATENT OFFICE.

NEWTON F. FONER, OF PITTSBURGH, PENNSYLVANIA, ASSIGNOR TO STAR METAL STAMPING CO., OF NEW YORK, N. Y.

FASTENER AND SNAP.

1,202,372.  Specification of Letters Patent.  Patented Oct. 24, 1916.

Application filed June 6, 1916. Serial No. 102,035.

*To all whom it may concern:*

Be it known that I, NEWTON F. FONER, a citizen of the United States, residing at Pittsburgh, in the county of Allegheny and State of Pennsylvania, have invented a new and useful Fastener and Snap, of which the following is a specification.

The present invention appertains to fasteners and snaps, such are are used upon ladies' garments, vehicle tops and the like, and aims to provide a fastener for general use embodying a novel assemblage of the component elements whereby to enhance the efficiency and utility of the device, the device at the same time being extremely simple and inexpensive in construction, and the parts thereof being readily manufactured and assembled.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a plan view of one form of fastener. Fig. 2 is a section on the line 2—2 of Fig. 1. Fig. 3 is a plan view of the male member. Fig. 4 is a plan view of a modified form. Fig. 5 is a section on the line 5—5 of Fig. 4. Fig. 6 is a plan view of another variation. Fig. 7 is a plan view of a fourth form. Fig. 8 is a section on the line 8—8 of Fig. 7. Fig. 9 is a plan view of still another modification. Fig. 10 is a section on the line 10—10 of Fig. 9. Figs. 11 and 12 are plan views of other forms. Fig. 13 is a plan view of a modified form of spring for use with the fastener shown in Fig. 12.

The fastener illustrated in Figs. 1, 2 and 3 is of circular form, and the female member or part embodies a concaved or dished sheet metal disk 1 having a central aperture 2, and a second concaved or sheet metal disk 3 fitting the concaved side of the disk 1. The periphery or margin of the bottom disk 1 is bent back or reflexed, as at 4, over the edge of the disk 3, whereby to bead the edges of the two disks together. The two disks are provided with an annular series of apertures 5 adjacent the edges or bead thereof, whereby the female member can be readily sewed to the fabric or other material. The top or outer disk 3 is provided with a concentric circular portion 6 offset from its concaved side, and providing a shallow cavity or recess, and the offset portion 6 is provided centrally thereof with a concentric secondary offset portion 7 opposite the aperture 2. The offset portion 6 provides with the disk 1 an annular cavity or receptacle for a triangular wire spring 8, the corners of which contact with the periphery of the offset portion 6. The corners of the spring are held snugly between the offset portion 6 and disk 1, and the sides of the spring are curved slightly to bring their intermediate portions nearer the center of the spring, whereby said intermediate portions of the sides of the spring project slightly past the edge of the aperture or opening 2. The sides of the spring are separable.

The male member embodies a circular sheet metal disk 9 which is preferably concaved to fit the concaved disk 1, and the edge or margin of the disk 9 is preferably bent back or reflexed toward the convex side of the disk, to provide a marginal bead 10. The disk 9 is provided centrally thereof with an outstruck portion providing a circular head 11, and a contracted neck 12 connecting said head and body of the disk. The head 11 is provided with a central concavity 13, and said head and neck 12 provide an annular groove 14 for the engagement of the spring 8. The disk 9 can be provided with an annular series of apertures 15 for stitching the disk to the material, and the concaved top 13 of the head 11 is provided with apertures 16 whereby the thread can be passed through the apertures 16 and neck 12 to sew the male member to the material by means of the head 11. If this method of sewing the male member to the material is preferred, the disk 9 can be of smaller diameter. The head 11 is insertible through the aperture 12, and is adapted to snap past the spring 8, whereby the sides or limbs of said spring snap under the head 11 within the groove 14, thus holding the two members assembled, although they can be pulled apart manually. The secondary offset or outstruck portion 7 provides a pocket for receiving the head 11. The triangular spring 8 provides a three point contact between the interengaging portions of the two members, and said triangular spring can rotate within the offset or outstruck portion 6.

This style of fastener is extremely simple in construction, and can be easily manufactured at a small cost, the parts being readily manufactured and assembled. It is to be noted that the apertures 5 are located between the offset or outstruck portion 6 and the bead 4. The fastener can be constructed in various sizes and various materials. The fastener can also be constructed in various shapes and styles. Thus, as illustrated in Figs. 4 and 5, the plates 1ª and 3ª are of elliptical form, and the outstruck portion 6ª is also of elliptical form, being provided in this case with a central aperture 7ª for accommodating the head 11ª of the male member or plate 9ª. A square wire spring 8ª is used, the sides thereof being curved so that their intermediate portions are nearer the center of the spring whereby to engage behind the head 11ª. The head 11ª in this instance is provided with a convexed top 13ª. The spring 8ª in fitting within the elliptical portion 6ª, as seen in Fig. 4, will be prevented from rotating, and will be held firmly in place. The fastener illustrated in Fig. 6 is also of elliptical form, being provided with a square offset or outstruck portion 6ᵇ for the square spring. The fastener illustrated in Figs. 7 and 8 is of still different form, having straight longitudinal side edges and curved ends, the outstruck portion 6ᶜ being of similar shape and accommodating two opposite wire springs 8ᶜ, said springs having arcuate portions to seat against the arcuate ends of the portion 6ᶜ, and other arcuate portions adjacent the center of the female part for the engagement of the head 11ᶜ of the male part. The head 11ᶜ in this case is provided with an aperture 13ᶜ in its top.

The fastener illustrated in Figs. 9 and 10 is of square outline, and is provided with a square outstruck portion 6ᵈ arranged at an angle of 45 degrees with the body of the fastener, and accommodating a square spring such as used in the fasteners shown in Figs. 4 and 6.

Fig. 11 illustrates a circular fastener employing a circular spring 8ᵉ which is split or divided at one point, and the fastener illustrated in Fig. 12 is of a circular form and has an elliptical outstruck portion 6ᶠ accommodating an elliptical spring 8ᶠ divided at one end. The spring 8ᵍ illustrated in Fig. 13 can be used in place of the spring 8ᶠ, the limbs or sides of the spring 8ᵍ being curved to project toward one another for the engagement of the head of the male member.

Having thus described the invention, what is claimed as new is:

1. A fastener composed of male and female members, the male member having a head, the female member embodying a pair of plates, one having a central aperture to receive said head, and the other having an outstruck portion larger than the aperture, the edge of one plate being reflexed around the edge of the other plate, and a spring fitted snugly within said outstruck portion between the same and the apertured plate to snap into engagement with said head, the two plates having contacting thread-receiving portions surrounding the outstruck portion and located between said outstruck portion and reflexed edge, and the thread-receiving portions having thread receiving apertures between the outstruck portion and reflexed edge.

2. A fastener composed of male and female members, the male member comprising a plate having a hollow head and a neck connecting said head and body portion of the plate, the head having a concaved top provided with apertures for stitching the male member to the material through the neck, and the female member having spring means adapted to snap into engagement with said head.

In testimony that I claim the foregoing as my own, I have hereto affixed my signature in the presence of two witnesses.

NEWTON F. FONER.

Witnesses:
 SIMON SAPIRSTEIN,
 WALTER G. FERENS.

Copies of this patent may be obtained for five cents each, by addressing the "Commissioner of Patents, Washington, D. C."